(12) United States Patent
Weeks et al.

(10) Patent No.: US 10,211,608 B2
(45) Date of Patent: Feb. 19, 2019

(54) MECHANICAL COUPLING DEVICES FOR MOTORIZED LEVERING-IN ASSEMBLIES, RELATED ELECTRICAL APPARATUS AND METHODS

(71) Applicant: Eaton Intelligent Power Limited, Dublin (IE)

(72) Inventors: Cory Robert Weeks, Pittsburgh, PA (US); David Andrew Schreiber, Pittsburgh, PA (US); Hongbin N. Wang, Novi, MI (US); Raymond Peter Gundy, II, Indiana, PA (US); Bryant-Douglas Harris, Pittsburgh, PA (US)

(73) Assignee: Eaton Intelligent Power Limited, Dublin (IE)

( * ) Notice: Subject to any disclaimer, the term of this patent is extended or adjusted under 35 U.S.C. 154(b) by 8 days.

(21) Appl. No.: 15/604,955

(22) Filed: May 25, 2017

(65) Prior Publication Data

US 2018/0342857 A1    Nov. 29, 2018

(51) Int. Cl.
*H02B 11/127* (2006.01)
*F16D 11/16* (2006.01)
*F16H 25/20* (2006.01)
*H02B 11/167* (2006.01)
*H01H 71/02* (2006.01)

(52) U.S. Cl.
CPC ............ *H02B 11/127* (2013.01); *F16D 11/16* (2013.01); *F16H 25/20* (2013.01); *H01H 71/0264* (2013.01); *H02B 11/167* (2013.01); *F16H 2025/2071* (2013.01); *F16H 2025/2093* (2013.01)

(58) Field of Classification Search
CPC .......................... H02B 11/127; H01H 71/0264
USPC ........................................................ 200/50.23
See application file for complete search history.

(56) References Cited

U.S. PATENT DOCUMENTS

| | | | | | |
|---|---|---|---|---|---|
| 1,798,705 | A | * | 3/1931 | Rugg | H02B 11/127 218/91 |
| 2,885,502 | A | * | 5/1959 | Eichelberger | H02B 11/127 200/50.25 |
| 4,396,813 | A | * | 8/1983 | Hesselbart | H02B 11/127 192/141 |
| 5,278,722 | A | * | 1/1994 | Peruso | H02B 11/00 200/50.24 |

(Continued)

FOREIGN PATENT DOCUMENTS

| CN | 202308875 | 7/2012 |
|---|---|---|
| EP | 1227557 | 7/2002 |

OTHER PUBLICATIONS

Eaton/Cutler—Hammer "Magnum Low Voltage Air Circuit Breakers" Product Brochure (16 pages) (1998).

(Continued)

*Primary Examiner* — Kyung Lee
(74) *Attorney, Agent, or Firm* — Myers Bigel, P.A.

(57) ABSTRACT

Levering-in systems, particularly suitable for electrical apparatus such as switchgears, have a motor that can drive a drive shaft during a powered operation and include a mechanical coupling assembly that can physically disconnect or decouple the drive shaft from a drivetrain coupled to the motor to allow manual levering-in with a reduced user crank force and/or to inhibit damage to components of the motorized drive system.

21 Claims, 14 Drawing Sheets

(56) References Cited

U.S. PATENT DOCUMENTS

| | | | |
|---|---|---|---|
| 6,247,867 B1 | 6/2001 | Speer | |
| 6,705,813 B2 | 3/2004 | Schwab | |
| 7,019,229 B1 | 3/2006 | Weister et al. | |
| 7,881,044 B2* | 2/2011 | Jacobsen | H02B 11/12 200/240 |
| 8,247,716 B2* | 8/2012 | Weister | H02B 11/10 200/50.24 |
| 8,319,123 B2 | 11/2012 | Faulkner et al. | |
| 8,420,964 B2* | 4/2013 | Pearce | H02B 11/127 200/50.25 |
| 8,431,845 B2 | 4/2013 | Pollitt et al. | |
| 8,953,305 B2 | 2/2015 | Rodgers et al. | |
| 2008/0022673 A1 | 1/2008 | Morris et al. | |
| 2009/0255789 A1* | 10/2009 | Narayanan | H02B 11/127 200/50.21 |
| 2012/0085628 A1 | 4/2012 | Pearce et al. | |
| 2014/0090963 A1 | 4/2014 | Sudhakar et al. | |
| 2014/0151207 A1* | 6/2014 | Rodgers | H02B 11/127 200/335 |

OTHER PUBLICATIONS

Photographs of Prior Art Product—"Eaton Remote Racking System (REMRACK)" 3 views (1 page) (date unknown, but prior to filing date of the present application).

Extended European Search Report corresponding to European Patent Application No. 18169642.8 (9 pages) (dated Oct. 10, 2018).

* cited by examiner

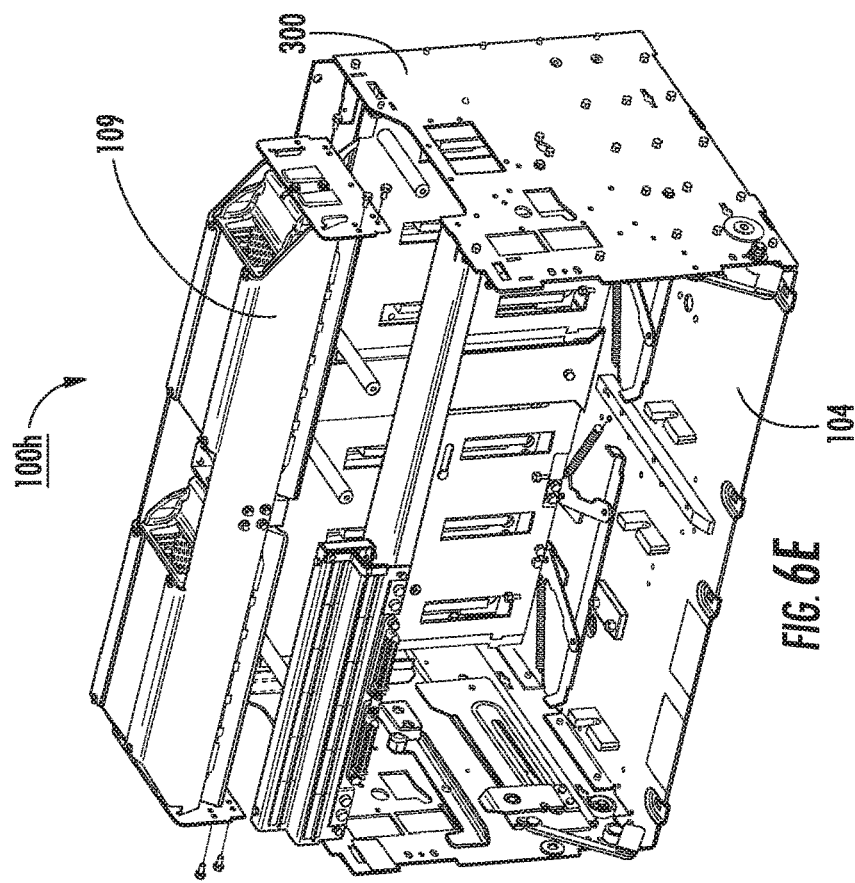
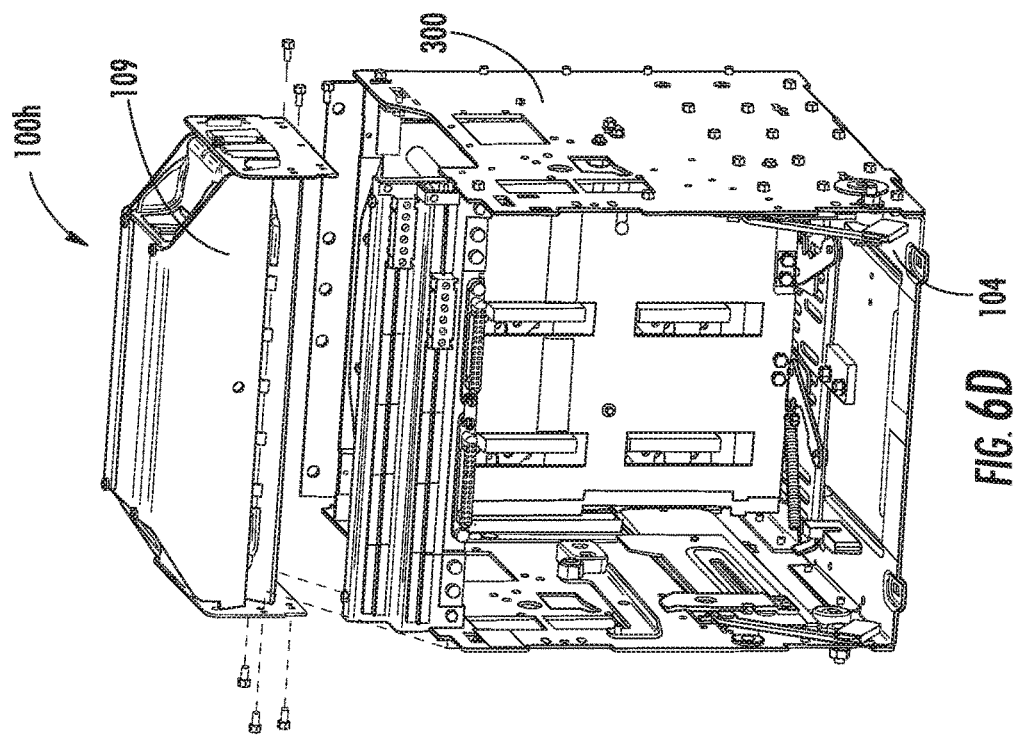

MECHANICAL COUPLING DEVICES FOR MOTORIZED LEVERING-IN ASSEMBLIES, RELATED ELECTRICAL APPARATUS AND METHODS

FIELD OF THE INVENTION

The present invention relates to coupling devices particularly suitable for use with circuit breakers levering—in assemblies.

BACKGROUND OF THE INVENTION

Electrical switching apparatus used in power distribution systems are often mounted within an enclosure either individually or in combination with other devices such as switchgear (e.g., without limitation, circuit switching devices and circuit interrupters such as circuit breakers, contactors, motor starters, motor controllers and other load controllers).

Some electrical switching apparatus such as, for example, some medium-voltage and low-voltage circuit breakers, can be relatively large. In order to facilitate movement (e.g., installation; removal; maintenance), some circuit breakers are commonly coupled to lever-in mechanisms which permit such circuit breakers to be drawn out of the switchgear enclosure. Accordingly, such circuit breakers are commonly known in the art as "draw-out" circuit breakers. The circuit breaker may be further supported within a draw-out frame, commonly known in the art as a cassette or chassis. The switchgear enclosure generally includes a number of cells, with each cell being structured to receive a corresponding circuit breaker. The draw-out mechanism can include, for example, a combination of rails and rollers coupled to one or the other, or both, of the sidewalls of the cell and the sides of the corresponding circuit breaker and/or cassette, which is to be drawn into and out of the cell. A levering-in assembly (sometimes referred to as a "lev-in" system), which among other components includes a drive screw, facilitates levering the circuit breaker into the cassette. Draw-out circuit breakers are described in further detail, for example, in commonly assigned U.S. Pat. No. 7,019,229; U.S. Pat. No. 8,431,845; and U.S. Pat. No. 8,953,305, which are hereby incorporated by reference as if recited in full herein.

It is sometimes desirable to provide automated (e.g., without limitation, motorized or powered) operation of the lev-in system, for example, to avoid manual operation and/or to allow for remote operation. It is also sometimes desirable for an operator to be able to use a manual crank to manually operate the lev-in system.

SUMMARY OF EMBODIMENTS OF THE INVENTION

Embodiments of the invention are directed to a coupling device that allows the dual lever-in efforts to be transmitted to the main drive shaft. Under normal operation, the coupling device will couple an electric motor and associated gear train to the drive shaft. Under emergency or manual operation, the coupling device will disconnect the electric motor and gear train from the drive shaft. The coupling device not only allows a user to carry out either manual or electric operations but can also operate with far less manual force than would be required if the motor and associated drive system remains attached to the drive shaft during the manual levering-in operation. When mechanically decoupled, the drive shaft is free from resistance of the motor and/or to avoid damaging the motor or associated automatic drivetrain from damage during a manual levering-in.

The levering-in system can be configured to move an electrical device, i.e., circuit breaker, between a withdrawn position and a levered-in position in a compartment of an enclosure.

Embodiments of the invention are directed to drive system sub-assemblies that include a longitudinally extending drive shaft with a longitudinally extending drive screw, a driven member attached to a flange that extends externally about the drive shaft and a mechanical coupling assembly held (directly or indirectly) by the drive shaft and extending at least partially into the flange. The mechanical coupling assembly decouples the drive shaft from the flange in a mechanically decoupled state and couples the drive shaft to the flange in a mechanically coupled state.

The flange can include a longitudinally extending channel and an outer wall with a plurality of circumferentially spaced apart slots. The drive shaft or the drive screw can include a longitudinally extending channel and a plurality of circumferentially spaced apart slots. The coupling assembly can have outer wall segments that project out the slots of the drive shaft or the drive screw and at least partially through the slots of the flange to couple the drive shaft to the flange in the coupled state. The outer wall segments can retract laterally inwardly into the channel of the flange to decouple the flange from the drive shaft in the decoupled state.

The channel of the flange can be a cylindrical internal through channel and can be attached to or integral with an external circumferentially extending gear as the driven member.

The slots of the flange can have a lesser longitudinal extent than the slots of the drive shaft or the drive screw.

The drive shaft can include a longitudinally extending cavity that is adjacent the drive screw or the drive screw can have a longitudinally extending cavity that is aligned with a longitudinally extending channel of the drive shaft. The cavity can hold at least one resilient member in communication with the coupling assembly whereby the at least one resilient member can apply a longitudinally extending bias force against the coupling assembly.

The mechanical coupling assembly can include a body that slides longitudinally inward and laterally retracts to thereby decouple the drive shaft from the driven member.

The body can include first and second cooperating members that hold at least one resilient member therebetween.

The at least one resilient member may be or include a laterally extending coil spring.

The body of the mechanical coupling assembly can include first and second cooperating members that each have an outerwall that tapers inward in a longitudinally inward direction. The first and second cooperating members can also include a laterally extending channel that holds the at least one resilient member between respective outerwalls.

The sub-assembly may include a push rod held in a longitudinally extending channel of the drive shaft. The push rod can slidably engage the coupling assembly to push the coupling assembly longitudinally inwardly to decouple the driven member from the drive shaft in the decoupled state.

The flange can have a wall with a plurality of circumferentially spaced apart slots. The drive shaft can have a longitudinally extending channel with a length and longitudinally opposing first and second end portions. The second end portion can have a plurality of circumferentially spaced apart slots or an adjacent end portion of the drive screw can have a plurality of circumferentially spaced apart slots. The push rod can have a length that is less than the length of the drive shaft channel. The push rod can have an inner end portion with a plurality of circumferentially spaced apart slots that align with the slots of the drive shaft or the slots of the drive screw. The coupling assembly can be held in an interior channel of the push rod and have outer wall segments that project out of the slots of the push rod, the drive shaft or the drive screw, and at least partially through the slots of the flange to couple the push rod and the drive shaft to the flange in the coupled state.

The flange can be directly or indirectly affixed to or integral with (optionally an end portion) of a circumferentially extending bevel gear as the driven member.

The sub-assembly can also include a motor for motorized levering-in that is coupled to the driven member in the coupled state and decoupled from the driven member in the decoupled state to thereby allow a manual levering in operation with the driven member decoupled from the motor.

Other embodiments are directed to an electrical apparatus. The electrical apparatus includes a housing enclosure having at least one interior compartment and a door; a withdrawable cassette; a circuit breaker held by the cassette; and a levering-in drive system in the cassette. The levering-in drive system includes: an electric motor; and a longitudinally extending drive shaft with an aligned longitudinally extending drive screw. The drive shaft can be coupled to the electric motor in the cassette for powered levering-in and can be manually hand cranked using a manual levering-in tool extended into a longitudinally extending channel of the drive shaft to turn the drive screw. The drive system also includes a flange attached to a driven member having an open cylindrical channel surrounding a segment of the drive shaft and a mechanical coupling assembly in the channel of the drive shaft and at least partially in the cylindrical channel of the flange attached to the driven member that can couple the drive shaft to the flange and decouple the drive shaft from the flange attached to the driven member. The levering-in drive system is configured to move the cassette in a path between a withdrawn position and a levering-in connected position in the interior compartment.

The flange attached to the driven member with the open cylindrical channel can have a wall with a plurality of circumferentially spaced apart slots. The drive shaft or the drive screw can include a plurality of circumferentially spaced apart slots. The coupler assembly can include outer wall segments that can project out the slots of the drive shaft or the drive screw and at least partially through the slots of the flange to couple the drive shaft to the flange in a mechanically coupled state. The outer wall segments of the coupling assembly can retract laterally inwardly into the channel of the flange to decouple the driven member from the drive shaft in a mechanically decoupled state.

The slots of the flange can have a lesser longitudinal extent than the slots of the drive shaft or the drive screw.

The drive shaft can include a longitudinally extending cavity that is adjacent the drive screw or the drive screw has a longitudinally extending cavity that is aligned with the longitudinally extending channel of the drive shaft. The cavity can hold at least one resilient member in communication with the coupling assembly whereby the at least one resilient member can apply a longitudinally extending bias force against the coupling assembly.

The mechanical coupling assembly can have a body with first and second cooperating members that hold at least one resilient member therebetween. The first and second cooperating members can each have an outer wall that tapers inward in a longitudinally inward direction and can also each have a laterally extending channel that holds the at least one resilient member between the outer walls.

The apparatus can also include a push rod held in the longitudinally extending channel of the drive shaft. The push rod slidably engages the coupling assembly or is integral therewith to push the coupling assembly inwardly to decouple the flange with the driven member from the motor in a decoupled state.

The flange can have a wall with a plurality of circumferentially spaced apart slots. The longitudinally extending channel of the drive shaft has a length and longitudinally opposing first and second end portions. The second end portion can have a plurality of circumferentially spaced apart slots or an adjacent segment of the drive screw can have a plurality of circumferentially spaced apart slots. The push rod can have a length that is less than the length of the longitudinally extending channel of the drive shaft and remains in the longitudinally extending channel of the drive shaft. The push rod can have an inner end portion with a plurality of circumferentially spaced apart slots that align with the slots of the drive shaft or the drive screw. The coupling assembly can be held in the push rod or be integral therewith and can comprise outer wall segments that project out of the drive shaft or the drive screw and at least partially through the slots of the flange to couple the push rod and the drive shaft to the flange.

Methods of levering-in a device into an enclosure, include: providing a levering-in system that can be carried out using a motor or manually using a levering-in tool; inserting a levering-in tool into a longitudinally extending channel of a drive shaft comprising a longitudinally extending drive screw; and pushing a coupling assembly held at least partially in the longitudinally extending channel of the drive shaft longitudinally inward toward the drive screw to mechanically decouple the drive shaft from an external gear held thereabout.

The methods can also optionally include one or more of: (a) withdrawing the levering-in tool to automatically return the coupling assembly to recouple the external gear to the drive shaft for motorized operation; and/or (b) pushing an internal push rod in the drive shaft channel with an inner end portion holding the coupling assembly in response to contact of an outer end portion with the levering-in tool; and/or (c) forcing outer end portions of the coupling assembly laterally inward into a channel of a flange attached to the external gear to decouple the drive shaft from the external gear, the flange having slots, the drive shaft or the drive screw having slots and the push rod having slots, wherein the coupling assembly resides in the push rod and the outer end portions extend out the drive shaft or the drive screw and at least partially through the slots of the flange to mechanically couple the drive shaft to the external gear.

Further features, advantages and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 6D is a partially exploded arc hood assembly of the electrical apparatus shown in FIG. 6A.

FIG. 6E is a partially exploded arc hood assembly of the electrical apparatus similar to that shown in FIG. 6D but is a double wide arch hood assembly according to embodiments of the present invention.

DETAILED DESCRIPTION OF EMBODIMENTS OF THE INVENTION

Figure 1:
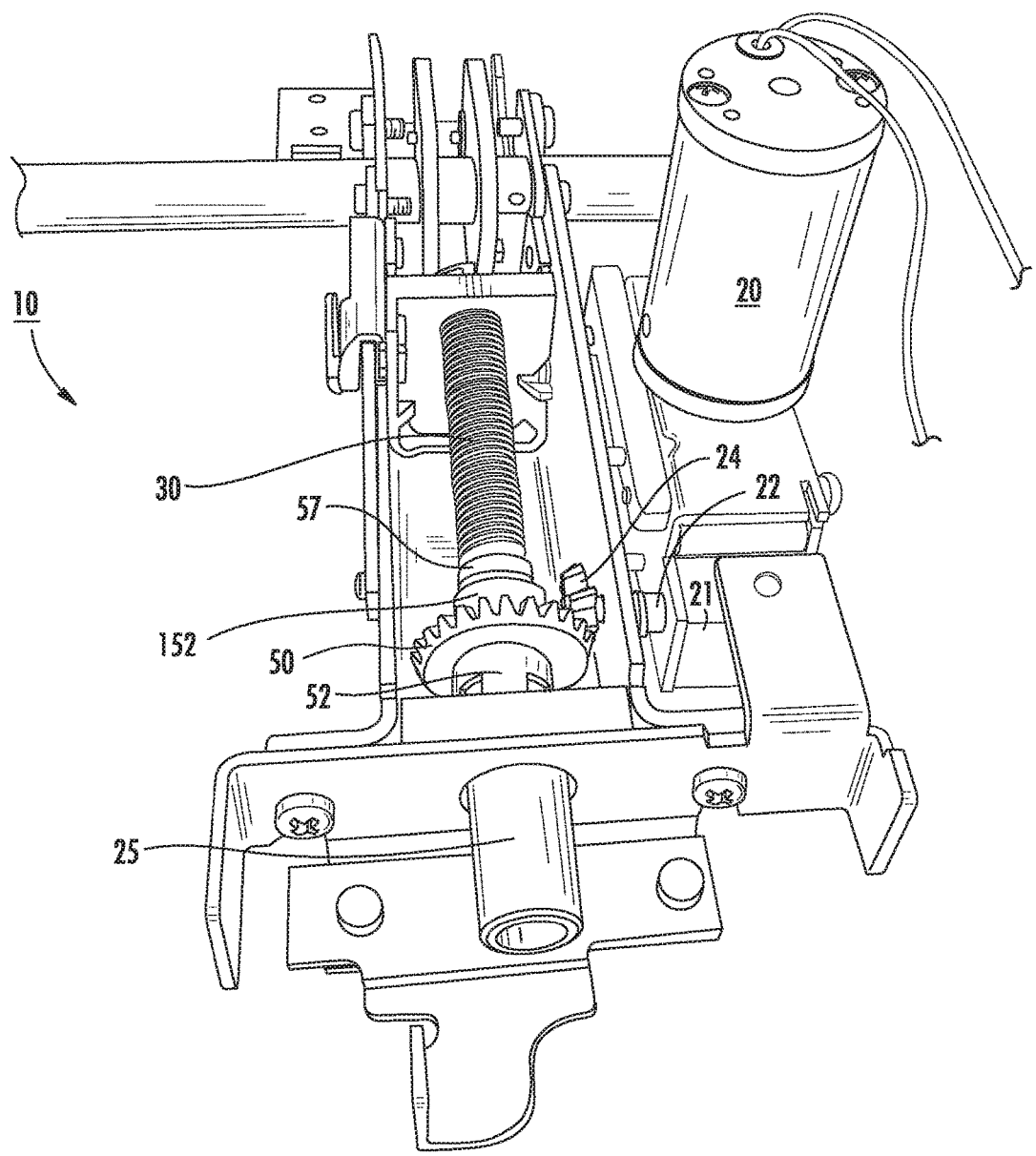
FIG. 1 is a top perspective view of an exemplary embodiment of a levering-in ("lev-in") system according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'").

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Broken lines in the flow charts represent optional features or steps.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

The term "about" refers to numbers in a range of +/−20% of the noted value.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Referring now to FIG. 1, an example of a levering-in assembly 10 is shown. The assembly 10 can include a levering-in tool portal 11 (i.e., hand crank) and an onboard motor 20 that is coupled to a drive shaft 25 that is attached to a levering-in drive screw 30. The motor 20 can be attached to a gearbox 21 and an output shaft 22 that may be orthogonal to the drive shaft 25 and is connected to a driving member 24, shown as a first gear. The driving member 24, i.e., the smaller bevel gear, can engage an adjacent driven member 50, i.e., bigger bevel gear. The driven member 50 is attached to a flange 52 that extends axially about the drive shaft 25. The driven member 50 can surround a longitudinally extending sub-segment of the drive shaft 25 and can be longitudinally spaced apart from the drive screw 30. Other motor arrangements and orientations and other motor drive train configurations may be used. Also, other cross-shaft drive members may be used than the gears 24, 50 shown. The drive shaft 25 can be integral with the drive screw 30 or they may be directly or indirectly attached members.

Figure 2A:
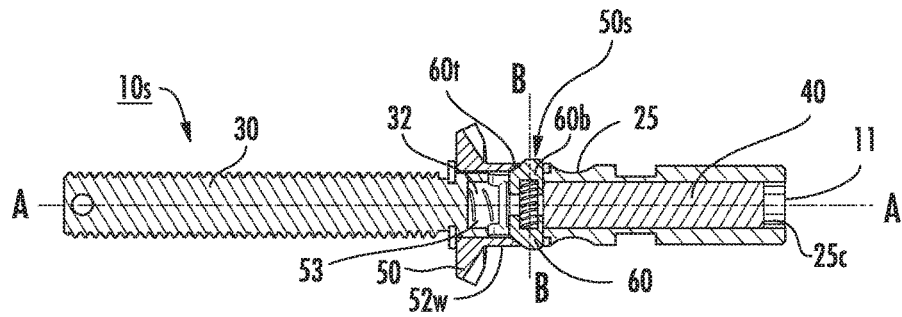
FIG. 2A is a section view of a sub-assembly of the lev-in system shown in FIG. 1 illustrating the drive shaft, driven member and flange about the drive shaft, and a coupling assembly in a mechanically connected state according to embodiments of the present invention.
Figure 2B:
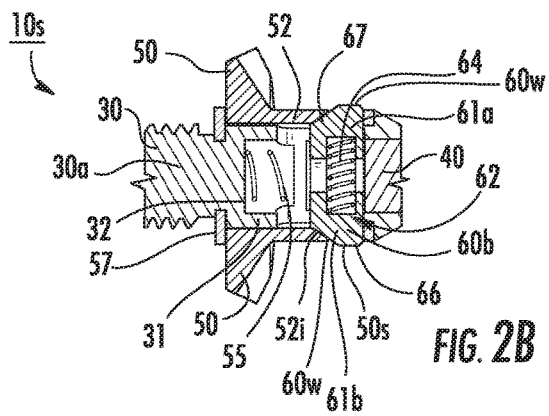
FIG. 2B is an enlarged partial section view of the sub-assembly shown in FIG. 2A.

Referring to FIGS. 2A and 2B, an example of a levering-in sub-assembly 10s for a levering-in system 10, such as that shown in FIG. 1 is shown. FIG. 2A, 2B, FIGS. 3A, 3B and 5A, illustrate the drive shaft 25 can have a longitudinally extending channel 25c that holds a coupling assembly 60.

Figure 5A:
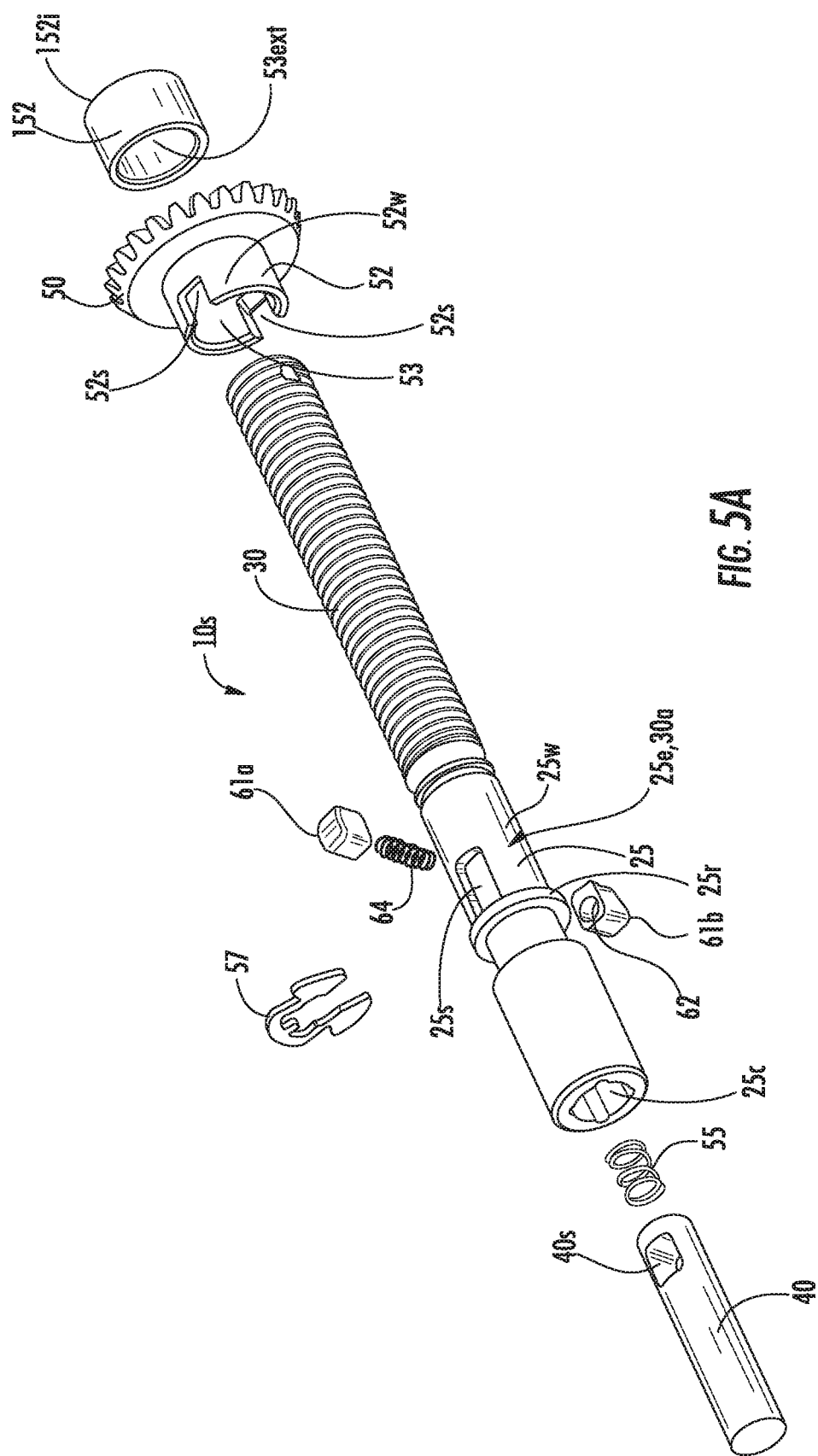
FIG. 5A is a perspective, partial exploded view of another embodiment of a levering-in subassembly according to embodiments of the present invention.
Figure 5B:
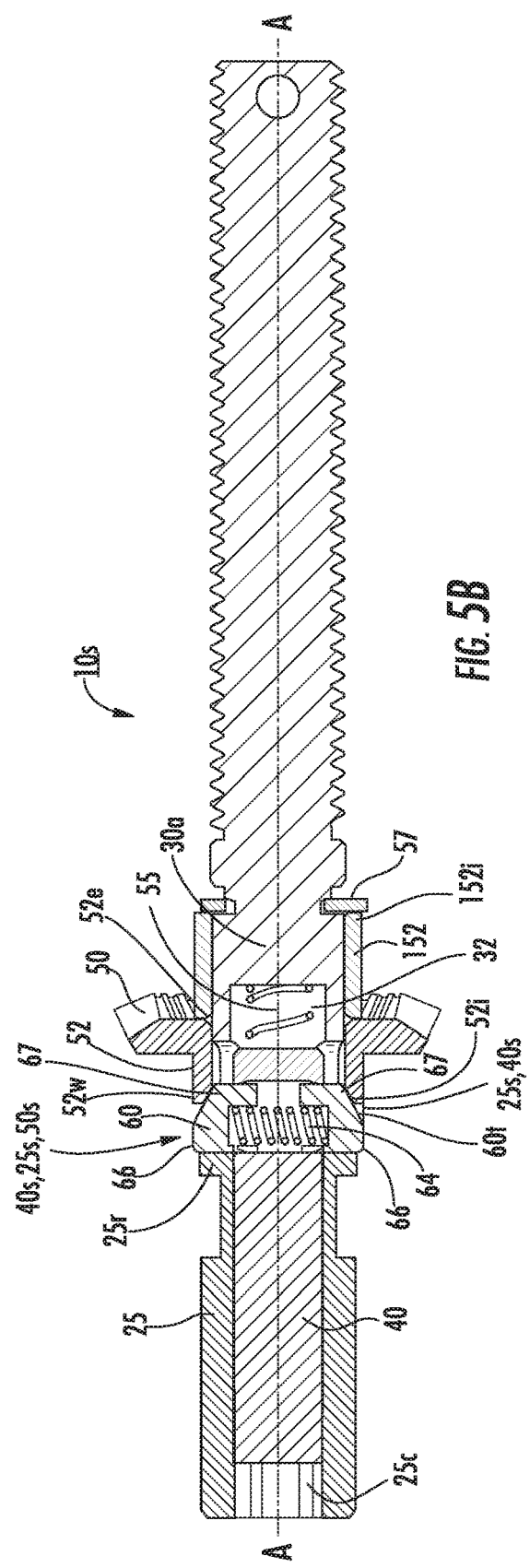
FIG. 5B is an assembled view of the embodiment shown in FIG. 5A illustrating the coupling assembly and drive shaft in a mechanically connected state according to embodiments of the present invention.
Figure 5C:
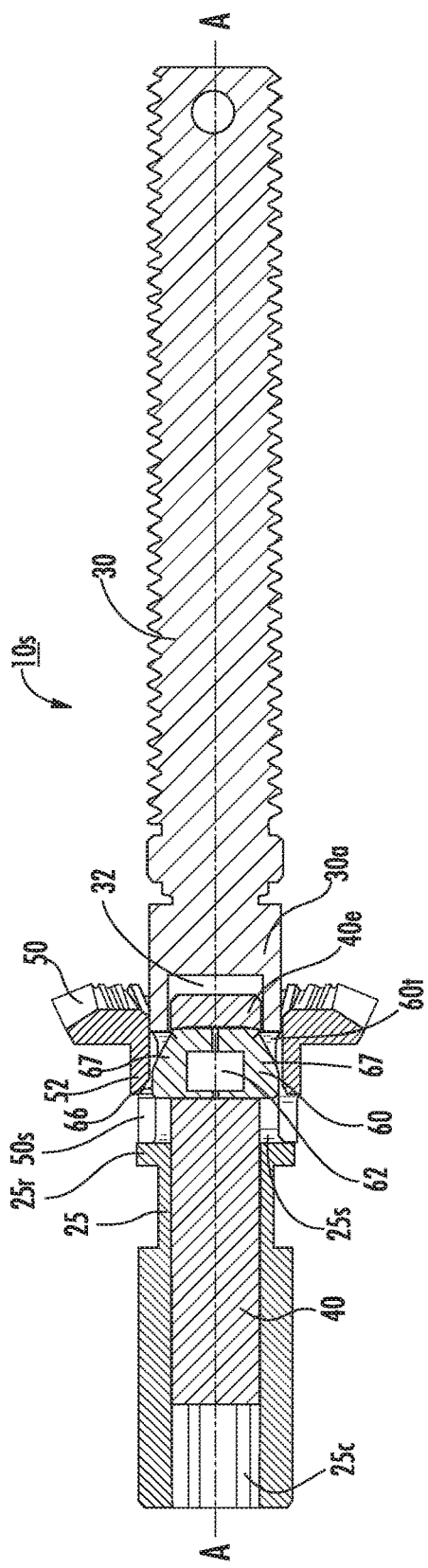
FIG. 5C is an assembled view of the embodiment shown in FIG. 5A illustrating the coupling assembly and drive shaft in a mechanically disconnected state according to embodiments of the present invention.

FIGS. 5A-5C illustrate another example embodiment of the levering-in sub-assembly 10s. It is noted that FIG. 5C is shown in section view without the fastener 57, secondary housing 152 and resilient member 64 for ease of illustration of other components. In this embodiment, a secondary (cylindrical) housing 152 (also shown in FIG. 1) which is external to the drive screw 30 can be used to secure an end portion of the flange 52, on an end away from the slots 50s, in a fixed longitudinal position using at least one fastener 57. Referring to FIG. 5A and FIG. 5B, the secondary housing 152 can face the driven member 50 and abut an internal end wall segment 52e of the flange 52 surrounding the open channel 53 to form an extension 53ext of the channel 53 in a direction toward the drive screw 30 between the driven member 50 and the inner end of the secondary housing 152i.

In some embodiments, the coupling assembly 60 can also reside in a channel 40c of a push rod 40 (FIG. 2A, 5B). The push rod 40 is held inside the drive shaft channel 25c and can longitudinally slidably extend and retract in the drive shaft channel 25c. Thus, the coupling assembly 60 resides in the channel 40c of the push rod 40, inside the drive shaft channel 25c of the drive shaft 25. Where used, the push rod 40 can remain in the longitudinally extending drive shaft channel 25c of the drive shaft 25 and can slidably move in response to a user inserting a tool, such as a levering-in tool, into the drive shaft channel 25c to push the push rod 40 inward. The push rod 40 can have a length that is less than a length of the drive shaft channel 25c, typically a length that is between 50-95% of the length of the drive shaft channel 25c.

As shown in FIGS. 2A and 2B, the mechanical coupling assembly 60 can reside adjacent a second end portion 25e of the drive shaft 25 and/or adjacent a first end portion 30a of the primary drive screw 30. The second end portion 25e of the drive shaft 25 can reside in a longitudinally extending channel 53 of the flange 52 attached to and extending longitudinally outward from the driven member 50, shown as the second, larger bevel gear. The channel 53 can be an open longitudinally extending cylindrical channel that resides external to and about a longitudinally extending cavity 32 in the first end portion 30a of the drive screw 30. The driven member 50 and/or flange 52 can be attached to the drive screw 30 with one or more fasteners 57, such as a clip retainer, as shown in FIG. 3B, to hold the driven member 50 and flange 52 in a fixed longitudinal location relative to the drive screw 30 and drive shaft 25.

The longitudinally extending centerline of the channel 53 of the flange 52 that is external to the drive shaft 25 can be aligned with the longitudinally extending axis (centerline) A-A (FIG. 2A) of the drive shaft channel 25c. Thus, the channel 53 can be concentric with the drive shaft channel 25c.

The driven member 50 and the flange 52 can be a unitary monolithic member or may be provided as separate components.

The orientation of the gear 50 with respect to the flange 52 can either be in a direction toward the drive screw 30 as shown in FIGS. 1 and 5A or in a direction toward the portal 11 as shown in FIG. 2A.

The cavity 32 of the drive screw 30 can hold at least one resilient member 55 that can apply a force to longitudinally push the coupling assembly 60 toward the portal 11 once a user removes or retracts the levering-in tool sufficiently to align with the slots or windows 50w and allow the outer wall segments 66 of the coupling body 60b to project outwardly at least a partial distance through the slots or windows 50w to automatically mechanically couple the drive shaft 25 to the driven member (i.e., gear) 50 and the flange 52. FIG. 2B and FIG. 5B show that an outer segment 66 can extend partially through the wall 52w of the flange 52 (at the slot or window 50w as will be discussed further below) to be flush or substantially flush with an outer surface of the wall 52w.

The at least one resilient member 55 can be a coil spring oriented with a longitudinally extending centerline axis (axis C-C) aligned with that of the longitudinally extending centerline axis of the drive screw 30 (axis A-A) as shown in FIGS. 2A, 3B and 5B, for example. The at least one resilient member 55 can be placed directly into the cavity 32 or held in a holding member 31 as shown, for example, in FIG. 4B. Where more than one resilient member 55 is used they can reside parallel to each other in the cavity 32 (not shown). In some embodiments, the at least one resilient member 55 can have other configurations, such as, for example, elastically compressible/deformable members, leaf springs, Belleville springs, Clover-Dome spring washers (see, e.g., U.S. Pat. No. 6,705,813), or any other type of flexible elastic member including, for example (polyurethane or other suitable material) O-rings. Combinations of different types of elastic or resilient members and/or more than one of the same type may also be used.

In some particular embodiments, and by way of example only, the at least one resilient member 55 can be configured to apply a first force F that can be in a range of 1-15 lbs-f, more typically between 1-5 lbs-f, such as 1 lbs-f, 2-lbs-f, 3 lbs-f, and the like, when compressed by the coupling assembly 60 during one connected or coupled state and a second lesser force that is 50% or less than the first force F when the coupling assembly 60 is in another connected state, i.e., mechanically switching the connection of the flange 52 to the drive shaft 25. The second force may be in a range of 0.5 and 1 lbs-f. These exemplary forces are by way of example only and not limiting to the invention as other ranges of forces can be applied according to the present invention.

The coupling assembly 60 can include first and second members 61a, 61b that can move laterally between extended and retracted (i.e., compressed) positions in a direction B-B that is orthogonal to a longitudinally extending axis A-A of the primary drive shaft 25 and primary drive screw 30. The mechanical coupling assembly 60 can include at least one resilient member 64, shown as a coil spring 64s, held between the first and second members 61a, 61b.

Figure 4A:
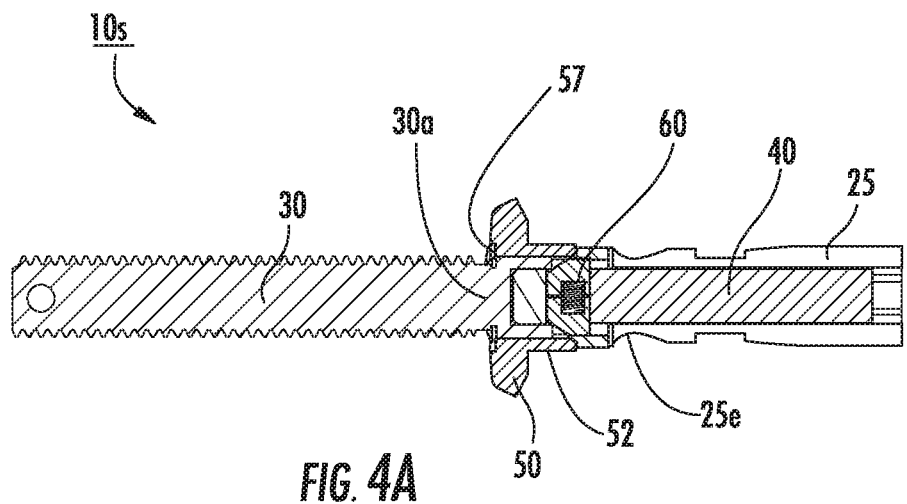
FIG. 4A is a section view of the sub-assembly shown in FIG. 2A illustrating the drive shaft, driven member and attached flange about the drive shaft, and the coupling assembly in a mechanically disconnected or decoupled state according to embodiments of the present invention.

In some embodiments, the first and second members 61a, 61b can be physically separate members that are laterally spaced apart when the mechanical coupling assembly 60 couples the driven member 50 to the drive shaft 25 (FIGS. 2A, 2B, 5B), i.e., in the mechanically "coupled" configuration and can reside closer together in a lateral extent, typically abut, when the driven member 50 (i.e., flange 52) is physically decoupled from the drive shaft 25 (FIGS. 4A, 4B, 5C), i.e., in the mechanically disconnected state or "decoupled" configuration.

The flange 52 can reside closely spaced apart from the outer wall of the drive shaft 25, typically in a range of about 0.05 mm to about 10 mm, such as a range of about 0.05 mm to about 0.25 mm or in a range of about 0.05 to about 1 mm, for example. These exemplary spacing distances are by way of example only and not limiting to the invention as other spacing ranges can be used according to the present invention.

The mechanical coupling assembly 60 can have a body 60b with an internal laterally extending channel 62 that holds the at least one resilient member 64 therein.

The flange 52 attached to the driven member 50, which can be a cylindrical bevel gear, can have a plurality of slots 50s. The drive shaft 25 can also have a plurality of slots 25s that can align with the slots 50s of the flange 52 (at least when mechanically connected or coupled together). The slots 25s, 50s allow segments of the first and second members 61a, 61b to project outwardly at least partially therefrom in the mechanically coupled configuration and to retract inward into the slots 50s in the mechanically disconnected state to mechanically disconnect the drive shaft 25 from the driven member 50, and thus the motor 20 (or other powered actuator and associated drive train). The term "slot" refers to an aperture extending through an outer wall of the noted member having lateral (optionally circumferential) and longitudinal extents. The slots 25s in the drive shaft 25 and the push rod 40 (where used) can also be described as windows. The term "window" refers to an aperture extending through an outer wall of the noted member having lateral (circumferential) and longitudinal extents. The outer walls of the drive shaft 25, and the push rod 40 (where used) can be cylindrical. The inner wall of the flange 52 and optionally the outer wall as well can be cylindrical. The channel 53 of the flange 52 can extend through the driven member 50 (here external gear 50) and be cylindrical.

Figure 3A:
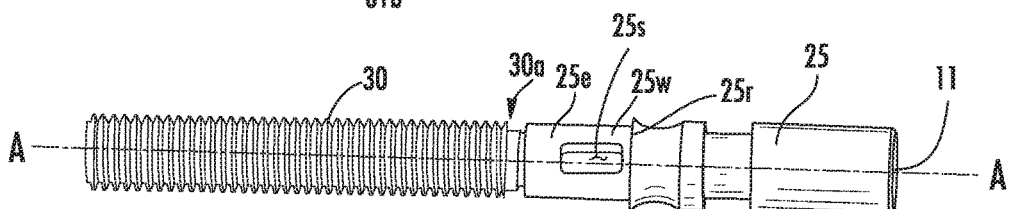
FIG. 3A is a side perspective view of a drive shaft attached to a drive screw of the sub-assembly shown in FIG. 2A according to embodiments of the present invention.
Figure 3B:
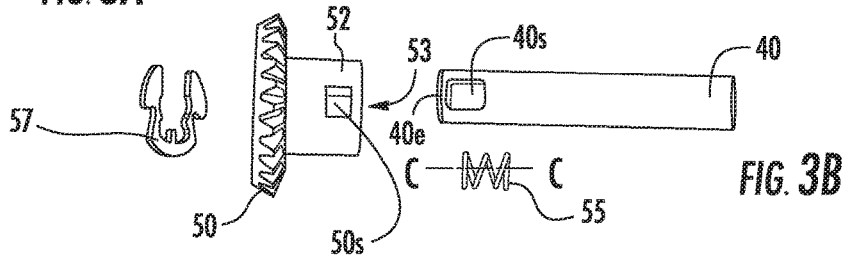
FIG. 3B is a partial exploded view of components of the sub-assembly shown in FIG. 2A according to embodiments of the present invention.
Figure 3C:
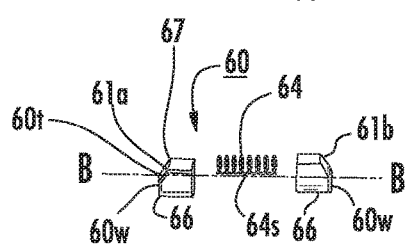
FIG. 3C is an exploded view of an exemplary mechanical coupling assembly of the sub-assembly shown in FIG. 2A according to embodiments of the present invention.

As shown in FIGS. 3A and 5A, the drive shaft 25 and the flange 52 can have pairs of diametrically opposed slots 25s, 50s. As shown in FIG. 5A, the slots 25s can be on an inner end portion 25e of the drive shaft 25 or on an outer facing end portion 30a of the drive screw 30. Thus, while described in certain embodiments as residing on the drive shaft 25, the drive shaft slots 25s may reside on the drive screw 30, typically adjacent the drive shaft 25. As shown in FIG. 5A, the slots 50s in the flange 52 can be open on one laterally extending end or as shown in FIG. 3B, can be closed at both laterally extending ends.

The resilient member 64 can be sized and configured to laterally outward forces against the respective outer walls 60w (i.e., against each member 61a, 61b, where two members are used) in the mechanically connected or coupled state and held in the channel 53 to securely hold the coupling assembly 60 to the drive shaft 25 in the mechanically connected state.

Figure 4B:
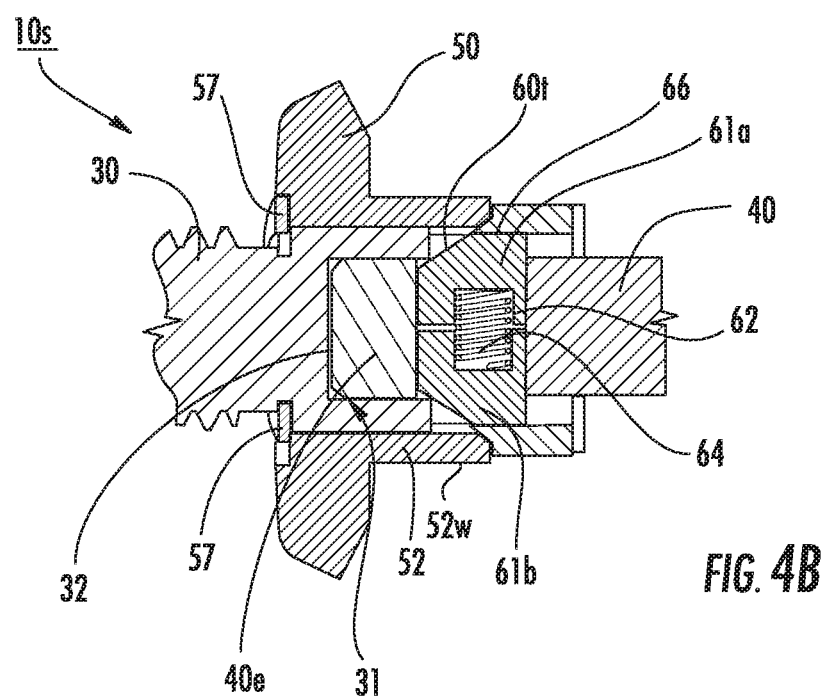
FIG. 4B is an enlarged partial section view of the sub-assembly in the disconnected state shown in FIG. 4A according to embodiments of the present invention.

The push rod 40 can push the coupling assembly 60 toward the drive screw 30 which forces the first and second members 61a, 61b to retract inwardly into the channel 53 of the flange 52, inside an outer wall 52w of the flange 52 (FIG. 4B). The flange 52 can have a wall 52w with a tapered end portion proximate a slot 50s facing the tapered end of the coupling assembly body 60b that can facilitate the retraction/compression as the coupling assembly 60 slides inwardly toward the drive screw 30.

In some embodiments, the push rod 40 can also have a plurality of slots 40s that can align with the slots 25s of the drive shaft 25 and the slots 50s of the flange 52. The push rod 40 can reside in the drive shaft 25 so that the push rod slots 40s are the innermost slots and the flange slots 50s are the outermost slots. The slots 40s, 25s, 50s can be concentric. The drive shaft slots 25s can have a greater longitudinal extent than the flange slots 50s. The push rod slots 40s can also have a greater longitudinal extent than the flange slots 50s.

The coupling assembly 60 can be configured so that in the connected and disconnected states (i.e., coupled and decoupled configurations), inner longitudinally extending end portions 67 of the outer walls 60w reside inside the flange 52 with a longitudinal extent that is blocked by the wall 52w of the flange 52 adjacent the slots 50s. The inner end portions 67 can be compressed against the inner wall 52i (FIG. 2B, 5B) of the flange 52 adjacent the slot 50s to help secure the coupling assembly 60 to the drive shaft 25 and the flange 52 in the mechanically connected state/coupled configuration.

The outer wall 60w of the coupling assembly 60 can have a tapered configuration 60t (FIGS. 2A, 3C, 5B, 5C) to taper inwardly in a longitudinal direction, with a longest lateral extent 66 oriented to face the portal 11.

In some embodiments, the first and second members 61a, 61b of the mechanical coupling assembly 60 may be attached with tethers, have bendable folds or accordion type foldable segments, or be provided as cooperating laterally slidable telescoping members and the like. Also, while the at least one resilient member 64 is shown as a single coil spring, multiple coil springs may be used. In some embodiments, the resilient member 64 can have other configurations, such as, for example, elastically compressible/deformable members, leaf springs, Belleville springs, Clover-Dome spring washers (see, e.g., U.S. Pat. No. 6,705,813), or any other type of flexible elastic member including, for example (polyurethane or other suitable material) O-rings. Combinations of different types of elastic or resilient members and/or more than one of the same type may also be used.

In some embodiments, the coupling assembly 60 can have additional members that can project at least partially through the slots 50s to releasably secure the drive shaft 25 to the flange 52.

As shown, for example, in FIGS. 3A and 5A-5C, the drive shaft 25 can have a radially projecting and circumferentially extending ridge 25r that abuts the outer facing end of the flange 52 when assembled to help provide a fixed longitudinal position when assembled.

The push rod 40 can move longitudinally a distance "D" between a home (mechanically connected or coupled state) to an extended position (for the mechanically disconnected or decoupled state) to move the coupling assembly 60 longitudinally away from the portal 11 to cause the coupling assembly 60 to disconnect the flange 52 and driven member 50 (i.e., gear) from the drive shaft 25. By way of example only, in some embodiments, this distance is typically between about 0.1 inch and 1 inch, such as about 0.25 inches and about 0.5 inches.

In some embodiments, to assemble the sub-assembly 10s (referring to FIG. 5A), the drive shaft 25 which can be integral with or attached to the drive screw 30 is provided. The coupling assembly 60 can be assembled as a separate sub-assembly. The resilient member 55 can be aligned with the cavity 32 in or behind the drive shaft channel 25c. The push rod 40 can be inserted into the drive shaft channel 25c to sit on/abut the resilient member 55. The slots 40s, 25s are aligned before or after the insertion. The assembled coupling assembly 60 can be fed through aligned slots 40s, 25s. The external flange 52 with the driven member 50 can be slid onto the drive screw 30 until the slots 50s are aligned with the coupling assembly 60 thereby trapping the coupling assembly 60 in the sub-assembly 10s. The flange 52 can be secured to the drive screw 30. In this embodiment, the secondary housing 152 is slid onto the drive screw after the flange 52 with the driven member 50 to abut the inner facing end portion 52e of the flange 52 and a fastener 57 is attached to the inner facing end portion of the secondary housing 152 and the drive screw 30 with the other end abutting the ridge 25r of the drive shaft 25 to secure the flange 52 and driven member 50 in a fixed longitudinal position.

In some embodiments, to assemble the coupling assembly 60 to the other components, the push rod 40 can be inserted into the drive shaft 25 and the windows 40w, 25w aligned. The drive screw 30 can be aligned with the drive shaft 25 with the cavity 32 facing the drive shaft 25. The resilient member 55 can be placed in the cavity 32. The resilient member 64 can be inserted through the windows 40w, 25w and placed into channel(s) 62 of the first and second cooperating members 61a, 61b. The flange 52 with the gear 50 can be slid over the screw and the window 50w aligned with the coupling assembly 60 thereby trapping the coupling assembly 60 in the sub-assembly 10s (FIG. 2B). The flange 52 can be secured to the drive screw 30.

In some embodiments, the motor 20 can be connected to the drive shaft 25 in other manners, including directly or indirectly using any suitable drivetrain. For example, instead of a direct gear to gear drive from the output shaft 22 shown in FIG. 1, other geared drivetrains or other drivetrains comprising a chain drive or belt system can be configured to turn the levering-in screw in response to a direction powered by the motor and an optional clutch. However, belt drives, or direct gear (rack and pinion), planetary or other drive systems may be used. Thus, the coupling assembly 60 and flange 52 can be configured to work with and accommodate different drivetrains and different powered actuators, which is shown as a motor as a preferred powered actuator.

The motor 20 can be an AC or DC motor. In some embodiments, the motor 20 can be a servo motor, a linear motor, a slot motor or other suitable motor. The motor voltage can be any suitable voltage, such as, for example, 24V DC, 48V DC, 60V DC, 110V DC, 125 V DC, 220 V DC, 250V DC, 120 AC, 220 AC, 230 AC or 240 AC. The motor 20 can comprise other motor drive technologies and linear drive elements, e.g., stepper motors, an AC motor with VFD (variable frequency drive), an induction motor with a feedback encoder and a VFD drive, ball screws, chain drives and rack and pinion drives and the like. Where a servo motor is used, the drive system may operate using motor feedback in a control system. This feedback can be used to detect unwanted motion, adjust speed and/or to monitor the accuracy of the commanded motion. The feedback can be provided by an encoder or sensor. The term "servo drive" refers to a drive system that controls the servo motor. Generally stated, the servo drive transmits electric current to the servo motor in order to produce motion proportional to the command signal. A command signal can represent a desired velocity, acceleration or deceleration, but can also represent a desired torque or position. The servo motor can have one or more sensors that report the motor's actual status back to the servo drive. The servo drive can adjust the voltage frequency and/or pulse width to the motor so as to correct for deviation or drift and the like. The motor controller can provide the necessary electric voltage and current protection. The motor controller system can have built-in current protection and position indication capabilities and more.

Figure 6A:
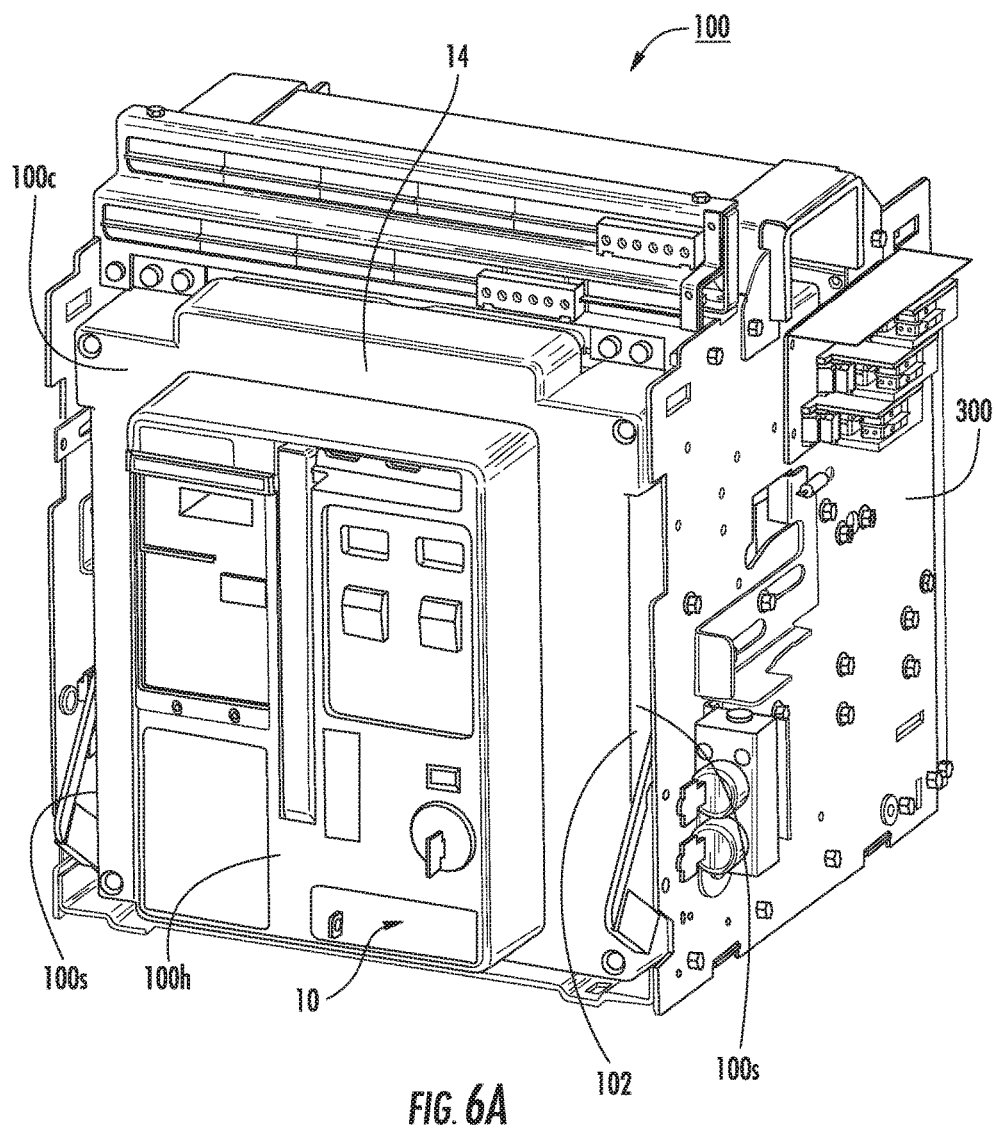
FIG. 6A is a front perspective view of an electrical apparatus comprising the levering-in assembly shown in FIG. 1 according to embodiments of the present invention.
Figure 6B:
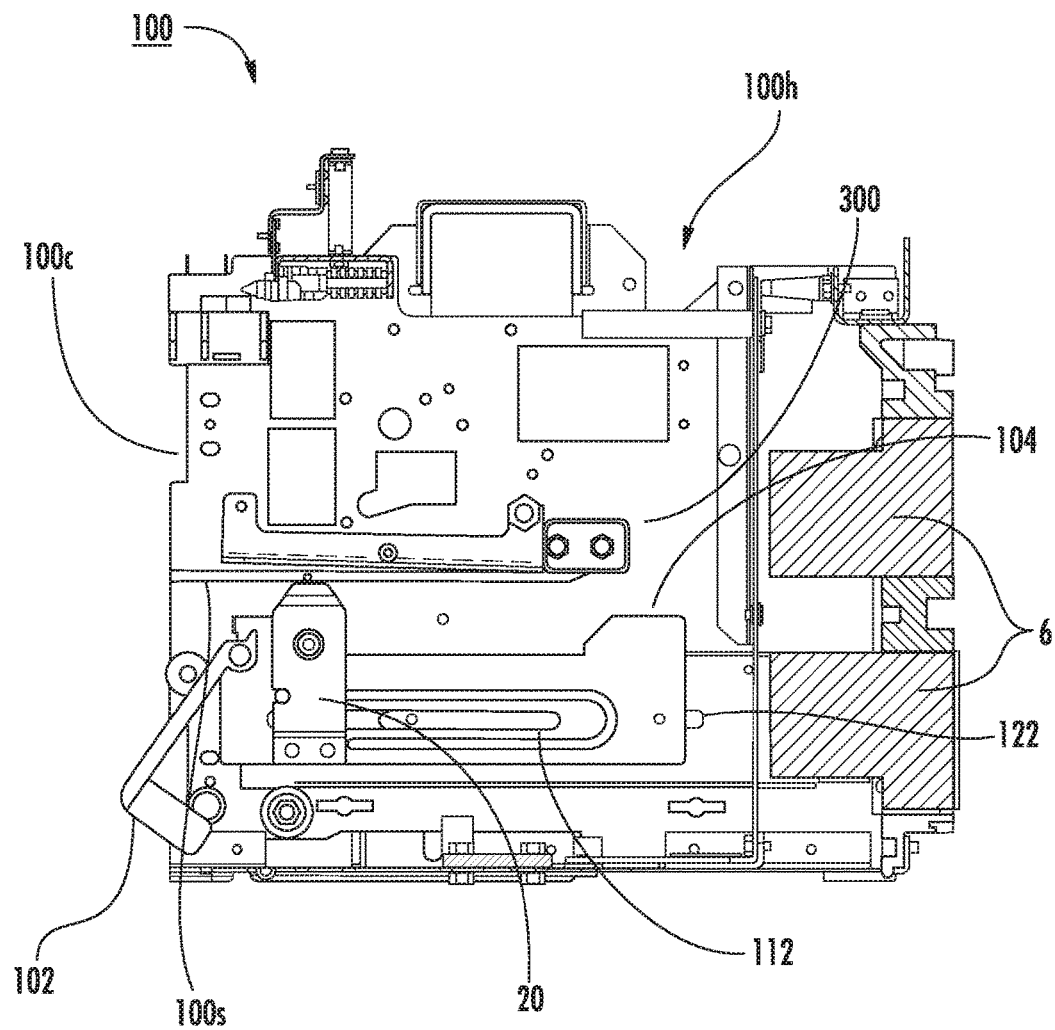
FIG. 6B is a side view of the electrical apparatus shown in FIG. 6A.

FIGS. 6A and 6B show a non-limiting example of an electrical switching apparatus or switchgear 100, such as a circuit breaker 100c employing the levering-in assembly 10. As shown, the apparatus 100 includes a housing 100h, separable contacts 6 (shown in simplified form) enclosed by the housing 100h, and an operating mechanism for opening and closing the separable contacts 6. In the example of FIG. 6A, the (circuit breaker) housing 100h includes first and second opposing sides 100s and a cover 14. That is, the levering-in system 10 allows the circuit breaker 100c to be racked or levered into and out of the cassette 300 such that it is movable among a plurality of positions. For example and without limitation, "connect", "disconnect" and "test" corresponding to the positions of the circuit breaker 100c with respect to the cassette 300.

As shown in FIGS. 6A and 6B, the levering-in assembly 10 can reside in a mounting assembly 102, which can be suitably coupled to the housing 100h. A drive assembly 112 comprising the levering-in assembly or system 10 can cooperate with the cassette 300 (FIG. 6A-6E). The motor 20 is structured to actuate the drive assembly 112 to move the circuit breaker 100c with respect to the cassette 300. Thus, the levering-in assembly 10 provides a mechanism for effectively racking or levering the circuit breaker 100c into an out of the cassette 300 (FIG. 6A, 6B), or to any desired position with respect to the cassette 300 (FIG. 6A, 6B), without requiring any other separate external gear (e.g., without limitation, external actuators; external motor; external wiring harnesses; external truck or cart assemblies; external couplings or tools) to facilitate movement of the circuit breaker 100c (FIG. 6A, 6B) and provides an integral levering-in system. The motor 20 is operable to rack the circuit breaker 100c (FIG. 6A, 6B) into or out of the cassette 300.

Thus, the mounting assembly 102 and drive assembly 112 with the levering-in system 10 can form a self-contained sub-assembly which is structured to be substantially disposed behind the cover 14 (FIG. 6A) of the circuit breaker 100c, withdrawable contactor truck or other device.

Figure 6C:
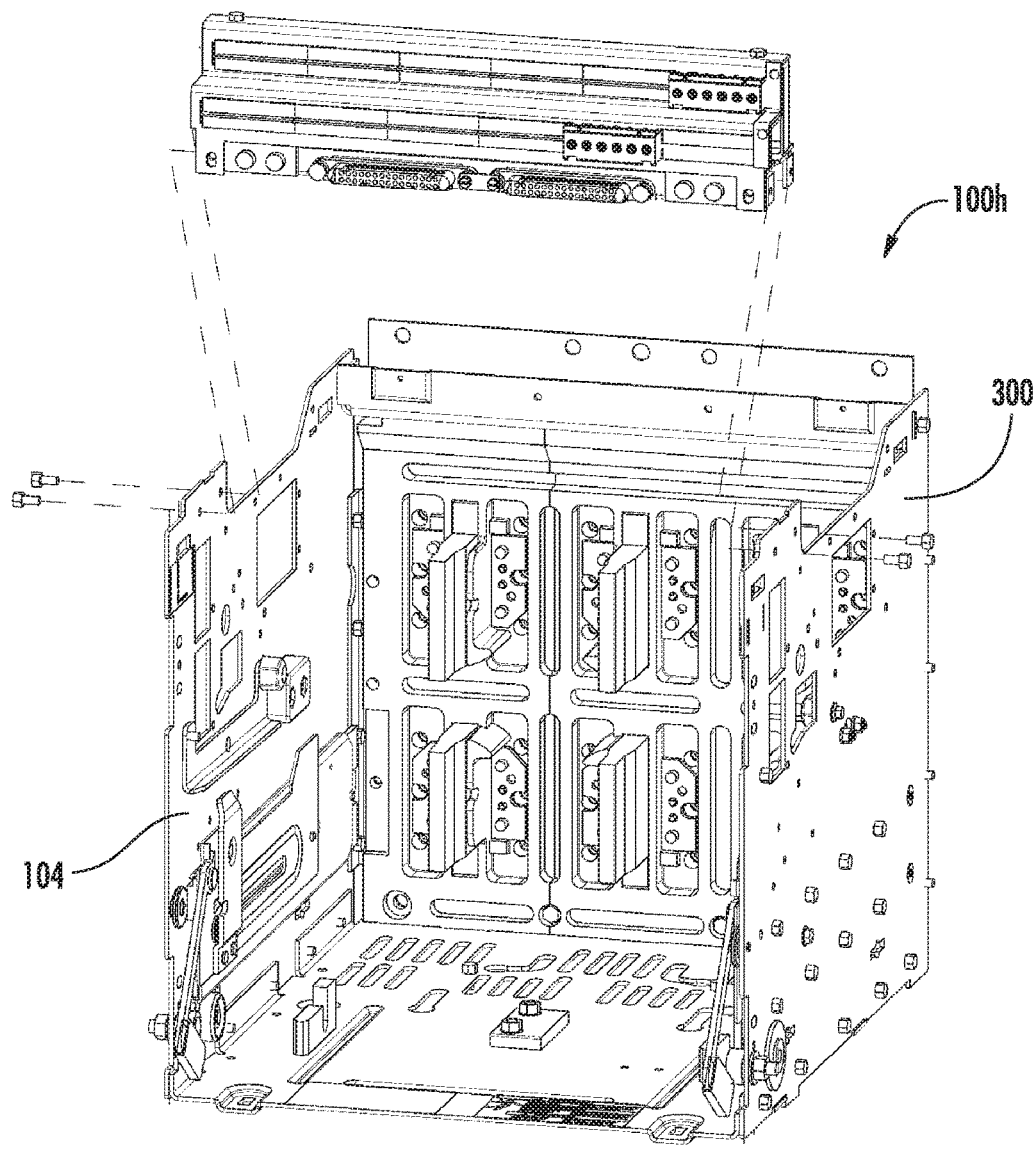
FIG. 6C is a partially exploded housing of the electrical apparatus shown in FIG. 6A.

FIG. 6C illustrates the cassette 300 with the housing 100h in a partial exploded view without the lev-in drive system 10. The housing provides a frame 104 with sidewalls that allow the rack in and rack out and cooperate with the circuit breaker 100c. FIGS. 6D and 6E illustrate an arc hood assembly 109 of the housing 100h. FIG. 6E illustrates a doublewide arc hood assembly 109.

Figure 7:
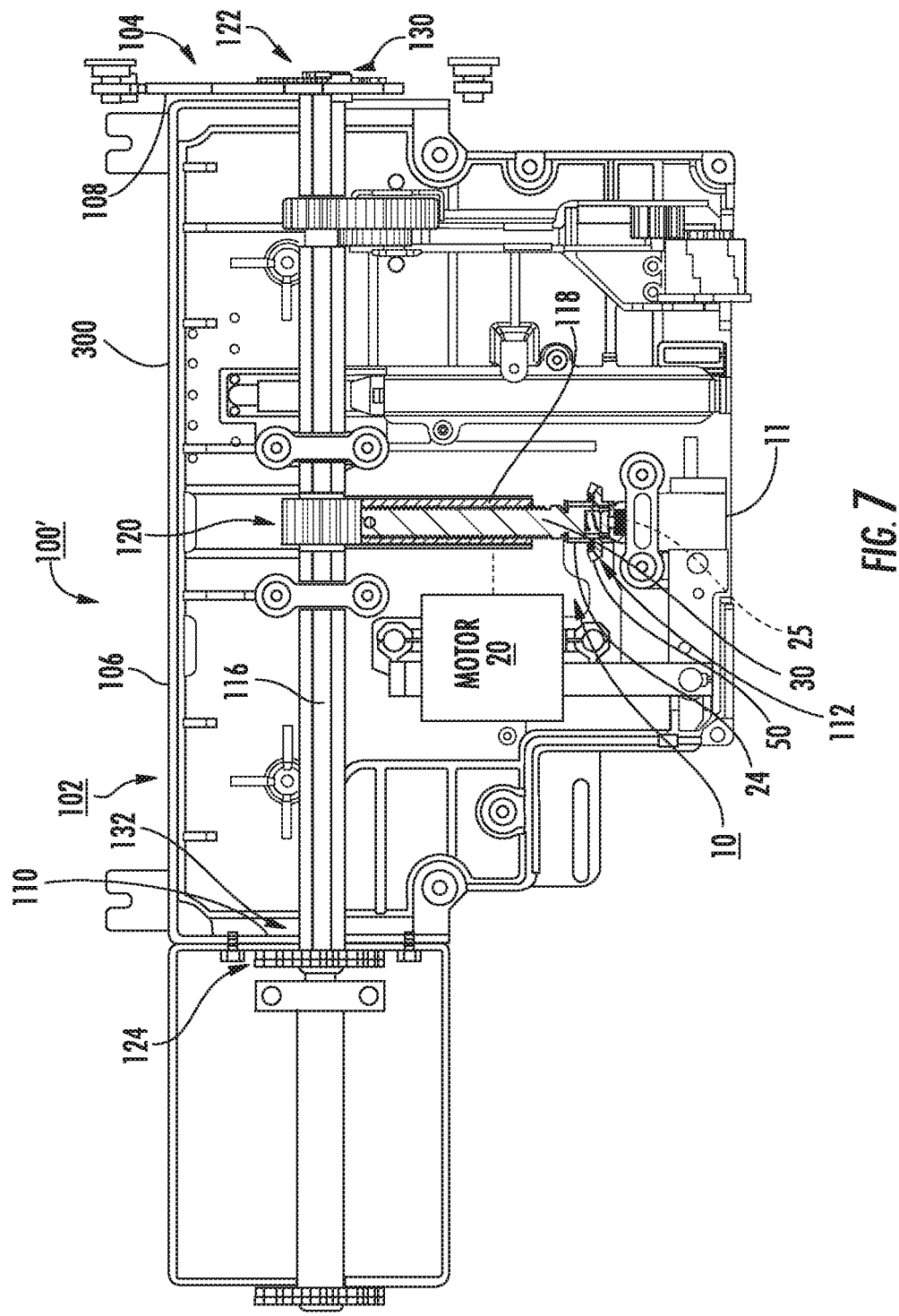
FIG. 7 is a top view of another embodiment of a lev-in system for another cassette/electrical apparatus according to alternative embodiments of the present invention.

As shown in an alternate embodiment of another electrical apparatus 100' in FIG. 7, the drive assembly 112 with the levering-in assembly 10 can include a secondary drive shaft 116, a plurality of gears 24, 50, 118, 120, 122, 124, and a number of racking members. The racking members are movably coupled to the cassette 300. The motor 20 is operable to move the gears 24, 50 to move the primary drive shaft 25, the screw 30, the rack 118 and the secondary drive shaft 116, thereby moving the racking members 126 to rack the circuit breaker into or out of the cassette 300. The mounting assembly 102 with the levering-in assembly 10 can include a frame 104 and a mount 106 that extends between opposing first and second sides 108,110 of the frame 104, as shown.

In the example of FIG. 7, the gears of the drive assembly 112 include a drive rack 118, a drive screw 30 and first and second racking gears 122,124. The secondary drive shaft 116 includes first and second opposing ends 130,132. The first racking gear 122 is coupled to the secondary drive shaft 116 at or about the first end 130, and the second racking gear 124 is coupled to the secondary drive shaft 116 at or about the second end 132. The drive screw 30 is also coupled to the secondary drive shaft 116, between the first and second ends 130,132. Accordingly, it will be appreciated that, in operation, the first racking gear 122 engages and moves the first racking member, and the second racking gear 124 engages and moves the second racking member.

When the motor 20 is powered, it drives gear 24, which turns driven member (gear) 50, thereby moving the drive screw 30 when the coupling assembly 60 is in the mechanically connected or coupled state. The drive rack 118 then moves the drive gear 120, thereby rotating the secondary drive shaft 116 and the first and second racking gears 122,124 coupled to the first and second ends 130,132, respectively, thereof. This, in turn, moves the racking member which can be movably coupled to the sides of the cassette 300. Consequently, movement of the circuit breaker with respect to the cassette 300 by way of the levering assembly 10 is initiated by the motor 20 and is controlled to rack or lever the circuit breaker into or out of any desired position with respect to the cassette 300.

The levering in system 10 can be configured to have sufficient torque to drive the breaker or other device 100c into a switchgear position. The breaker 100c (FIG. 6A) weight varies by frame size. The weights can be between 100 pounds to 2000 pounds, in some embodiments.

The electric breaker or switchgear 100c (FIG. 6A, 6B or 7) can be configured for AC or DC operation. In some embodiments, the breaker or switchgear 100 can be configured as a medium voltage motor control center (MCC). However, it is contemplated that the automated levering-in system 10 with the mechanical coupling assembly 60 may be used for other devices, circuits and circuit breaker configurations.

In some embodiments, the apparatus 100 can be medium voltage type breaker units, e.g., about 5 kV, 7.2 kV, 15 kV, 12 kV, 17.5 kV, 24 kV, 38 kV and the like with weights between about 100-2000 pounds.

The electrical apparatus 100 can be a switching device can be a multi-phase vacuum contactor but other current interrupters configurations may be used. Typically, the multi-phase vacuum contactor has a three-phase configuration but other numbers of phases can be used.

The levering-in assemblies 10 can be configured to accommodate or allow the same or different travel lengths between service and test (levering-in and withdrawn) positions inside a respective compartment 102 (FIG. 6A). In some embodiments, the travel distance can be about 200 mm for a 12/17.5 kV unit while a larger voltage rated unit (e.g., about 24 kV) may have a travel distance of about 300 mm.

Figure 8:
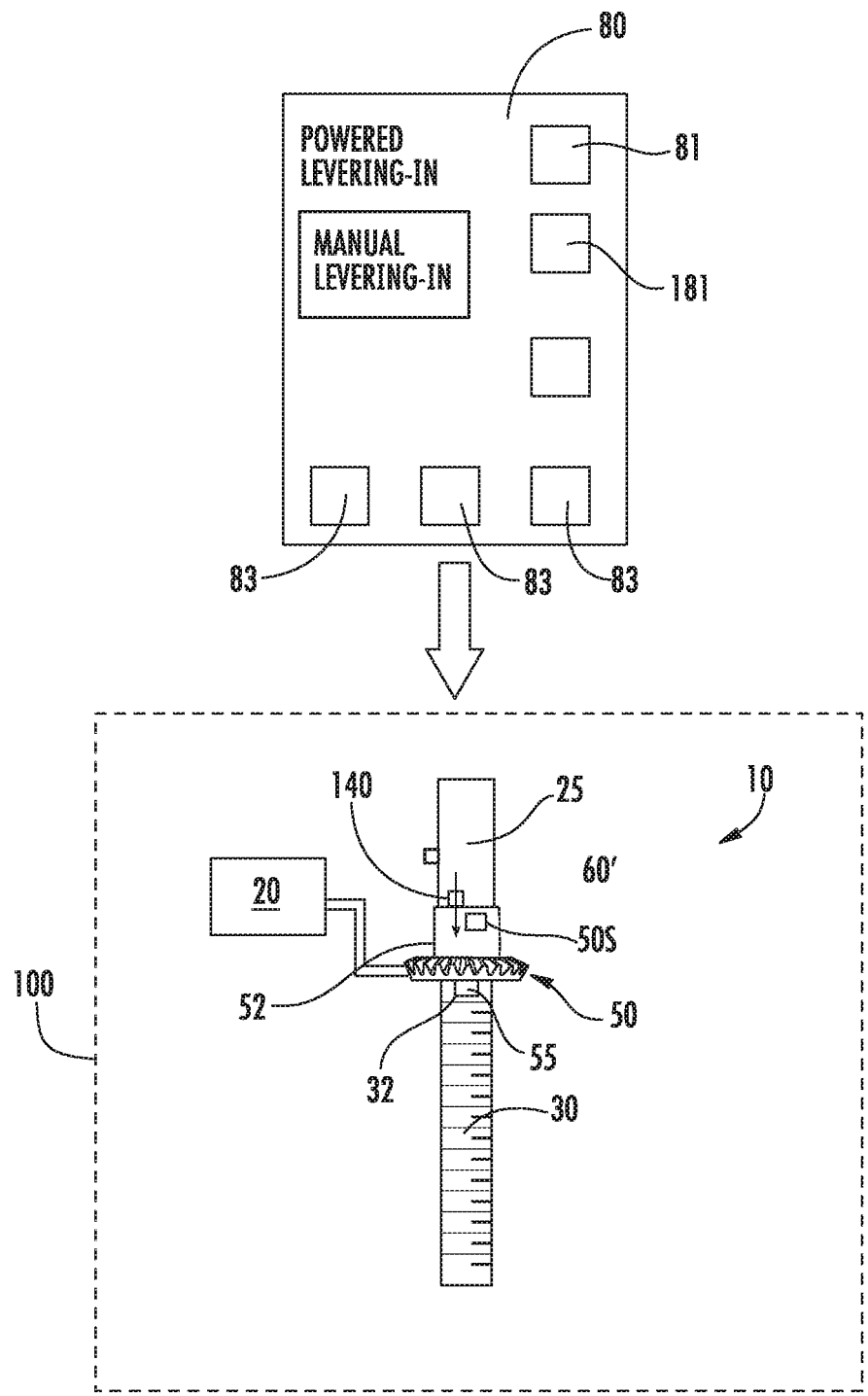
FIG. 8 is a schematic illustration of another embodiment of a lev-in sub-assembly according to embodiments of the present invention.

As shown in FIG. 8, in some embodiments, an integrated actuator 140 that can be (typically remotely) electronically controlled to push the coupling assembly 60' longitudinally inward to mechanically disconnect or decouple the drive shaft 25 from the driven member (i.e., gear) 50 and/or attached flange 52 extending about the drive shaft 25. Thus, the push rod 40 is not required. The integrated actuator 140 can reside in the flange 52 and can be in any suitable form.

FIG. 8 also schematically illustrates a controller 80 for controlling a motorized levering-in and/or a manual levering in that can communicate with the mechanical coupling assembly 60' according to embodiments of the present invention. The controller 80 can be an electronic or analog controller or can include both analog and electronic controllers and may be a wired or wireless interface with the breaker 100c or other device 100. The controller 80 can be mounted as a display option on the housing and/or breaker 100c and/or be provided as wireless or wired remote input.

The controller 80 can have a user interface (UI) with a powered "rack in" input selection 81 and a manual "rack in" 181 input selection and various indicators 83 associated with the status of the breaker 100c (FIG. 6). When a manual rack in mode is selected, the coupling assembly 60' can be directed to mechanically disconnect the drive shaft from the flange 52, thus the gear 50 from the motor 20. The controller 80 and associated control circuit can protect the motor 20 from being burnt, provide anti jamming capability, allow the mechanical decoupling using electronic controls and provide an easy to use UI. The integrated actuator 140 can be used in combination with or in lieu of the push rod 40 interface described above. The integrated actuator 140 may also or alternatively be manually or electronically activated using the push rod 40 and/or a levering in tool.

Embodiments of the present invention may include software and hardware aspects, all generally referred to herein as a "circuit" or "module." Software operation may be implemented using discrete hardware components, one or more Integrated Circuits (IC), analog devices, application specific integrated circuits (ASICs), or a programmed digital signal processor or microcontroller. Where used, the controller 80 can include a processor that can be commercially available or custom microprocessor, microcontroller, digital signal processor or the like.

Figure 9A:
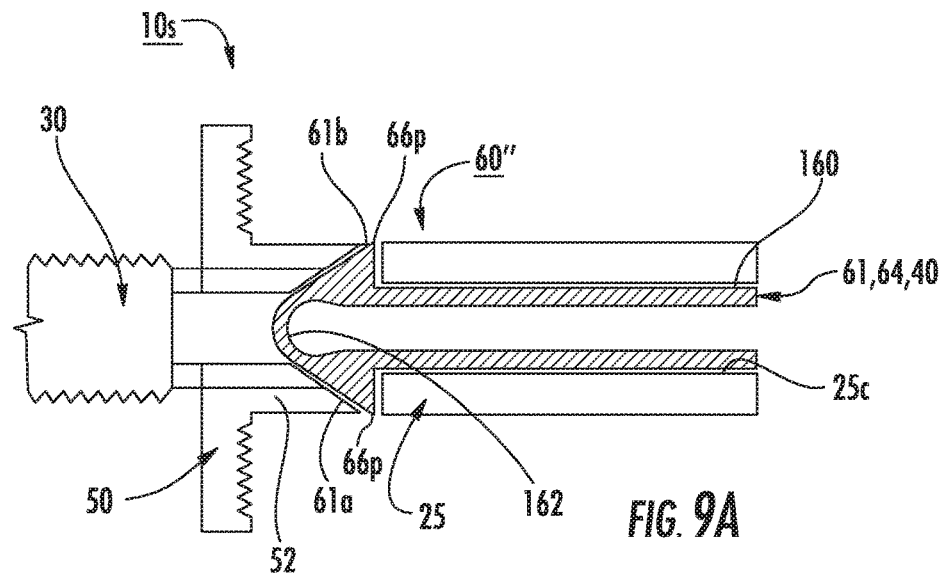
FIG. 9A is a side partial cutaway view of another embodiment of a lev-in sub-assembly according to embodiments of the present invention.
Figure 9B:
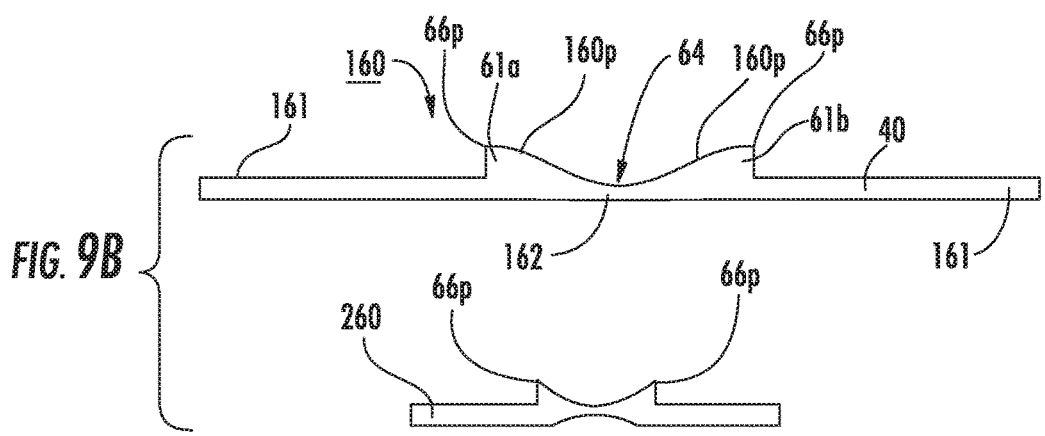
FIG. 9B is a partially exploded view of components of the coupling assembly shown in FIG. 9A according to embodiments of the present invention.
Figure 9C:
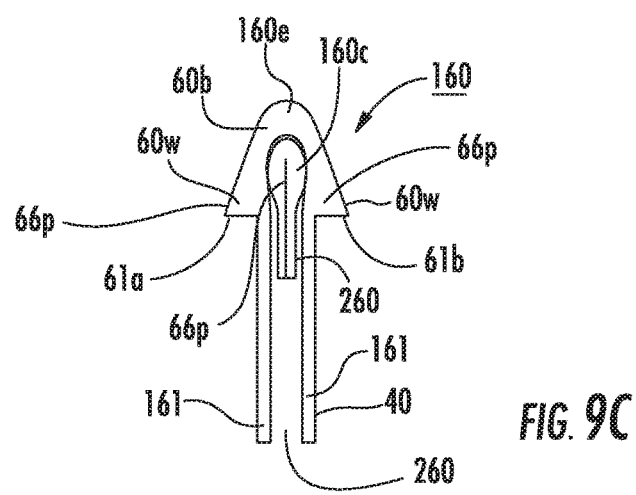
FIG. 9C is an assembled view of the components shown in FIG. 9B according to embodiments of the present invention.

FIGS. 9A-9C illustrate another embodiment of a lev-in sub-assembly according to embodiments of the present invention. The coupling assembly 60" can comprise a formed (i.e., stamped) member 160 that can be configured to act as a combination of at least two of a push rod 40, a resilient member 64, and a coupling member body 60b (having cooperating members 61a, 61b) and outer walls 60w that form the projections 66p that can extend through slots 50s, 25s, when bent/folded into shape and held in the drive shaft channel 25c. FIGS. 9B and 9C illustrate that the member 160 can have a length that can be folded to create an internal longitudinally extending channel 160c. Longitudinally extending legs 161 can provide the pusher 40. The shaped medial segment 162 can provide the cooperating members 61a, 61b. The leading end 160e (when folded) formed by the medial segment 162 may also form the resilient member 64.

To provide additional projection members 66p, one or more additional members 260 can be held in the channel 160c when the body 160 is folded. The inner member 260 can be oriented to be 90 degrees offset from the projections in the outer member 160 and can extend the respective projections 66p to engage other slots 25s, 50s that are circumferentially spaced apart from the slots holding the first and second projections 66p. The inner member 160 may be shorter than the outer member 160.

In some embodiments, the member 160 and 260 (where used) can be formed of flat sheet metal stock and have a thickness in a range of about 0.10 and 0.10 inches. However, other thickness may be used. The member 160 and 260 (where used) can comprise a spring steel, for example.

Figure 10:
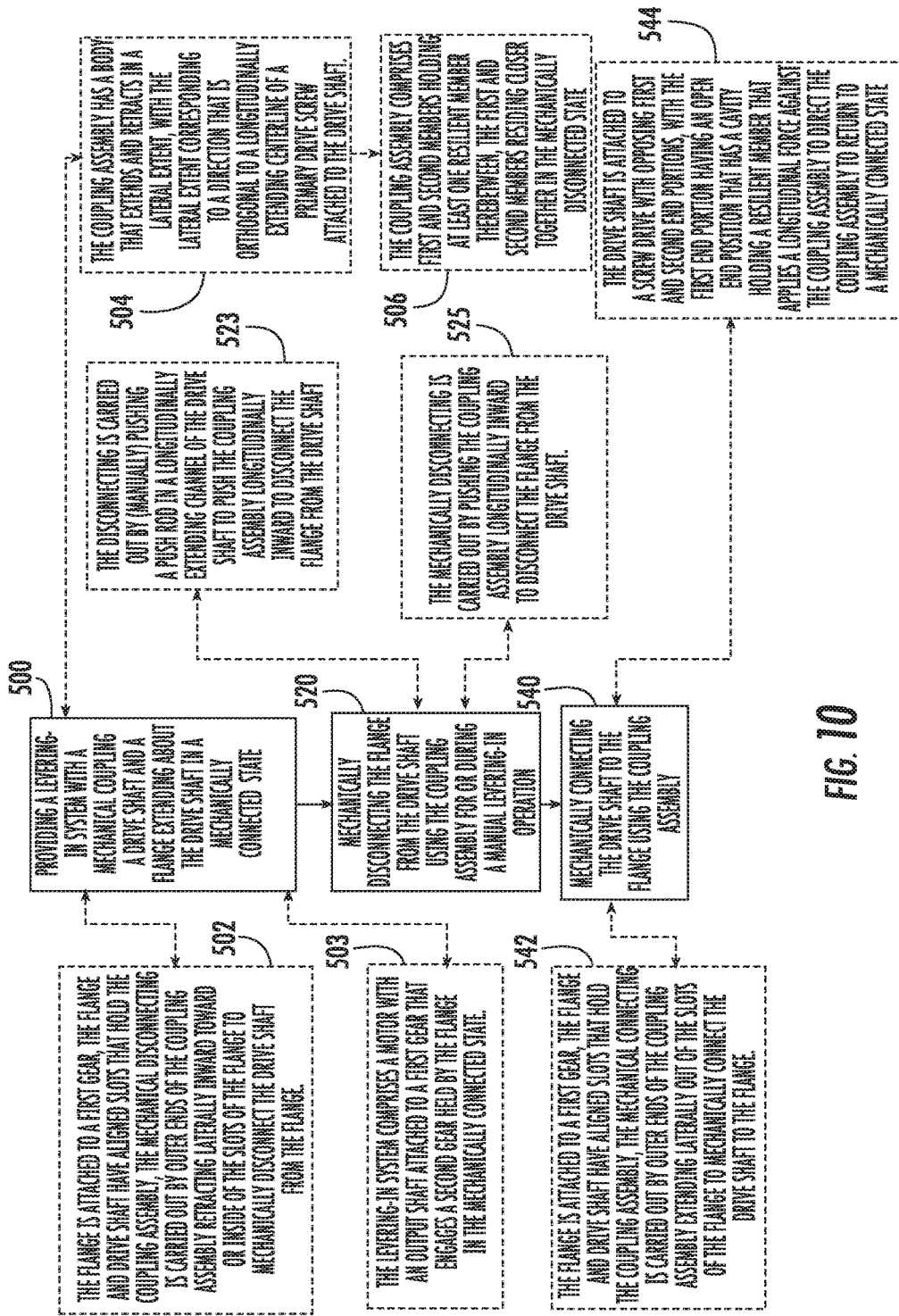
FIG. 10 is a flow chart of a method of operating a levering-in system according to embodiments of the present invention.

FIG. 10 is a flow chart of a method of selectively using an integral motorized levering-in system according to embodiments of the present invention. The method includes providing a levering-in system with a mechanical coupling assembly attached to a drive shaft and a flange extending about the drive shaft in a mechanically connected state (block 500). Mechanically disconnecting the flange from the drive shaft using the coupling assembly for or during a manual levering-in operation (block 520). Mechanically connecting the drive shaft to the flange using the coupling assembly (block 540).

The flange can be attached to a first gear, the flange and drive shaft can have aligned slots that hold the coupling assembly, and the mechanical connecting or coupling is carried out by outer ends of the coupling assembly extending laterally out of the slots of the flange to mechanically connect the drive shaft to the flange (block 502).

The levering-in system comprises a motor with an output shaft attached to a first gear that engages a second gear connected by the flange in the mechanically connected state (block 503).

The coupling assembly has a body that extends and retracts in a lateral extent, with the lateral extent corresponding to a direction that is orthogonal to a longitudinally extending centerline of a primary drive screw attached to the drive shaft (block 504).

The coupling assembly comprises first and second members holding at least one resilient member therebetween, the first and second members residing closer together in the mechanically disconnected or decoupled state (block 506).

The mechanically disconnecting can be carried out by manually pushing a push rod in a longitudinally extending channel of the drive shaft to push the coupling assembly longitudinally inward to disconnect the flange from the drive shaft (block 523).

The disconnecting can be carried out by electronically pushing the coupling assembly longitudinally inward to disconnect or decouple the flange from the drive shaft (block 525).

The flange can be attached to a first gear, the flange and drive shaft have aligned slots that hold the coupling assembly, and the mechanical disconnecting can be carried out by outer ends of the coupling assembly retracting laterally inward toward or inside of the slots of the flange to mechanically disconnect or decouple the drive shaft from the flange (block 542).

The drive shaft can be attached to a screw drive with opposing first and second end portions, with the first end portion having an open end portion that has a cavity holding a resilient member that applies a longitudinal force against the coupling assembly (block 544).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A drive system sub-assembly, comprising:
   a longitudinally extending drive shaft with a longitudinally extending drive screw;
   a driven member attached to a flange that extends externally about the drive shaft; and
   a mechanical coupling assembly held by the drive shaft and extending at least partially into the flange,
   wherein the mechanical coupling assembly decouples the drive shaft from the flange in a mechanically decoupled state and couples the drive shaft to the flange in a mechanically coupled state.

2. The sub-assembly of claim 1, wherein the flange comprises a longitudinally extending channel and a wall with a plurality of circumferentially spaced apart slots, wherein the drive shaft or the drive screw comprises a longitudinally extending channel and a plurality of circumferentially spaced apart slots, wherein the coupling assembly comprises outer wall segments that project out the slots of the drive shaft or the drive screw and at least partially through the slots of the flange to couple the drive shaft to the flange in the coupled state, and wherein the outer wall segments retract laterally inwardly into the channel of the flange to decouple the flange from the drive shaft in the decoupled state.

3. The sub-assembly of claim 2, wherein the slots of the flange have a lesser longitudinal extent than the slots of the drive shaft or the drive screw.

4. The sub-assembly of claim 1, wherein the drive shaft comprises a longitudinally extending cavity that is adjacent the drive screw or the drive screw has a longitudinally extending cavity that is aligned with a longitudinally extending channel of the drive shaft, wherein the cavity holds at least one resilient member in communication with the coupling assembly whereby the at least one resilient member applies a longitudinally extending bias force against the coupling assembly.

5. The sub-assembly of claim 1, wherein the mechanical coupling assembly comprises a body that slides longitudinally inward and laterally retracts to thereby decouple the drive shaft from the driven member.

6. The sub-assembly of claim 5, wherein the body comprises first and second cooperating members that hold at least one resilient member therebetween.

7. The sub-assembly of claim 6, wherein the at least one resilient member comprises a laterally extending coil spring.

8. The sub-assembly of claim 5, wherein the body of the mechanical coupling assembly comprises first and second cooperating members that each have an outerwall that tapers inward in a longitudinally inward direction, and wherein the first and second cooperating members also comprise a laterally extending channel that holds the at least one resilient member between respective outerwalls.

9. The sub-assembly of claim 1, further comprising a push rod held in a longitudinally extending channel of the drive shaft, wherein the push rod slidably engages the coupling assembly or is integral therewith to push the coupling assembly longitudinally inwardly to decouple the driven member from the drive shaft in the decoupled state.

10. The sub-assembly of claim 9, wherein the flange attached to the driven member comprises an outer wall with a plurality of circumferentially spaced apart slots, wherein the drive shaft comprises a longitudinally extending channel with a length and longitudinally opposing first and second end portions, wherein the second end portion comprises a plurality of circumferentially spaced apart slots or an adjacent end portion of the drive screw comprises a plurality of circumferentially spaced apart slots, wherein the push rod has a length that is less than the length of the drive shaft channel, wherein the push rod has an inner end portion with a plurality of circumferentially spaced apart slots that align with the slots of the drive shaft or the slots of the drive screw, and wherein the coupling assembly is held in an interior channel of the push rod and comprises outer wall segments that project out of the slots of the push rod, the drive shaft or the drive screw, and at least partially through the slots of the flange to couple the push rod and the drive shaft to the flange in the coupled state.

11. The sub-assembly of claim 1, wherein the flange is affixed to or integral with a circumferentially extending bevel gear as the driven member.

12. The sub-assembly of claim 1, further comprising a motor for motorized levering-in that is coupled to the driven member in the coupled state and decoupled from the driven member in the decoupled state to thereby allow a manual levering in operation with the driven member decoupled from the motor.

13. An electrical apparatus comprising:
a housing enclosure having at least one interior compartment and a door;
a withdrawable cassette;
a circuit breaker held by the cassette; and
a levering-in drive system in the cassette, the levering-in drive system comprising:
  an electric motor;
  a longitudinally extending drive shaft with an aligned longitudinally extending drive screw, wherein the drive shaft can be coupled to the electric motor in the cassette for powered levering-in and can be manually hand cranked using a manual levering-in tool extended into a longitudinally extending channel of the drive shaft to turn the drive screw;
  a flange attached to a driven member having an open cylindrical channel surrounding a segment of the drive shaft; and
  a mechanical coupling assembly in the channel of the drive shaft and at least partially in the cylindrical channel of the flange attached to the driven member that can couple the drive shaft to the flange and decouple the drive shaft from the flange,
wherein the levering-in drive system is configured to move the cassette in a path between a withdrawn position and a levering-in connected position in the interior compartment.

14. The apparatus of claim 13, wherein the flange comprises a wall with a plurality of circumferentially spaced apart slots, wherein the drive shaft or the drive screw comprises a plurality of circumferentially spaced apart slots, wherein the coupler assembly comprises outer wall segments that project out the slots of the drive shaft or the drive screw and at least partially through the slots of the flange to couple the drive shaft to the flange in a mechanically coupled state, and wherein the outer wall segments of the coupling assembly retract laterally inwardly into the channel of the flange to decouple the driven member from the drive shaft in a mechanically decoupled state.

15. The apparatus of claim 14, wherein the slots of the flange have a lesser longitudinal extent than the slots of the drive shaft or the drive screw.

16. The apparatus of claim 14, wherein the drive shaft comprises a longitudinally extending cavity that is adjacent the drive screw or the drive screw has a longitudinally extending cavity that is aligned with the longitudinally extending channel of the drive shaft, wherein the cavity holds at least one resilient member in communication with the coupling assembly whereby the at least one resilient member applies a longitudinally extending bias force against the coupling assembly.

17. The apparatus of claim 13, wherein the mechanical coupling assembly comprises a body with first and second cooperating members that hold at least one resilient member therebetween, and wherein the first and second cooperating members each have an outer wall that tapers inward in a longitudinally inward direction and also each have a laterally extending channel that holds the at least one resilient member between the outer walls.

18. The apparatus of claim 13, further comprising a push rod held in the longitudinally extending channel of the drive shaft, wherein the push rod slidably engages or is integral to the coupling assembly to push the coupling assembly inwardly to decouple the flange with the driven member from the motor in a decoupled state.

19. The apparatus of claim 18, wherein the flange comprises a outer wall with a plurality of circumferentially spaced apart slots, wherein the longitudinally extending channel of the drive shaft has a length and longitudinally opposing first and second end portions, wherein the second end portion comprises a plurality of circumferentially spaced apart slots or an adjacent segment of the drive screw comprises a plurality of circumferentially spaced apart slots, wherein the push rod has a length that is less than the length of the longitudinally extending channel of the drive shaft and remains in the longitudinally extending channel of the drive shaft, wherein the push rod has an inner end portion with a plurality of circumferentially spaced apart slots that align with the slots of the drive shaft or the drive screw, and wherein the coupling assembly is held in the push rod and comprises outer wall segments that project out of the slots of the push rod and the drive shaft or the drive screw and at least partially through the slots of the flange to couple the push rod and the drive shaft to the flange.

20. A method of levering-in a device into an enclosure, comprising:
providing a levering-in system that can be carried out using a motor or manually using a levering-in tool;
inserting a levering-in tool into a longitudinally extending channel of a drive shaft comprising a longitudinally extending drive screw; and
pushing a coupling assembly held at least partially in the longitudinally extending channel of the drive shaft longitudinally inward toward the drive screw to mechanically decouple the drive shaft from an external gear held thereabout.

21. The method of claim 20, further comprising one or more of:
(a) withdrawing the levering-in tool to automatically return the coupling assembly to recouple the external gear to the drive shaft for motorized operation; and/or
(b) pushing an internal push rod in the drive shaft channel with an inner end portion holding the coupling assembly in response to contact of an outer end portion with the levering-in tool; and/or (c) forcing outer end portions of the coupling assembly laterally inward into a channel of a flange attached to the external gear to decouple the drive shaft from the external gear, the flange having slots, the drive shaft or the drive screw having slots, wherein the coupling assembly resides in the push rod and the outer end portions extend out the slots of the push rod, the drive shaft or the drive screw and at least partially through the slots of the flange to mechanically couple the drive shaft to the external gear.

* * * * *